United States Patent
Nardone et al.

(10) Patent No.: US 6,205,550 B1
(45) Date of Patent: *Mar. 20, 2001

(54) TAMPER RESISTANT METHODS AND APPARATUS

(75) Inventors: Joseph M. Nardone, Portland; Richard P. Mangold, Forest Grove, both of OR (US); Jody L. Pfotenhauer, Tempe; Keith L. Shippy, Chandler, both of AZ (US); David W. Aucsmith, Portland, OR (US); Richard L. Maliszewski, Forest Grove, OR (US); Gary L. Graunke, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/924,740

(22) Filed: Sep. 5, 1997

Related U.S. Application Data

(63) Continuation-in-part of application No. 08/906,693, filed on Aug. 6, 1997, now Pat. No. 6,049,609, and a continuation-in-part of application No. 08/662,679, filed on Jun. 13, 1996, now Pat. No. 5,892,899.

(51) Int. Cl.⁷ .............. G06F 11/30; H04L 9/00; H04K 1/00
(52) U.S. Cl. .............. 713/200; 380/4; 380/30
(58) Field of Search ............... 395/186; 380/3, 380/4, 23, 30; 713/200, 201, 187, 194

(56) References Cited

U.S. PATENT DOCUMENTS

| | | | |
|---|---|---|---|
| 4,634,807 | * 1/1987 | Chorley et al. | 178/22.08 |
| 4,786,790 | 11/1988 | Kruse et al. | 235/380 |
| 4,847,902 | 7/1989 | Hampson | 380/4 |
| 4,866,665 | * 9/1989 | Haswell-Smith | 364/900 |
| 4,926,480 | 5/1990 | Chaum | 380/23 |
| 4,947,430 | 8/1990 | Chaum | 380/25 |
| 5,081,675 | 1/1992 | Kittirutsunetorn | 380/4 |
| 5,136,643 | * 8/1992 | Fischer | 380/23 |
| 5,224,160 | * 6/1993 | Paulini et al. | 380/4 |
| 5,265,164 | 11/1993 | Matyas et al. | 380/30 |
| 5,267,312 | 11/1993 | Thompson | 380/19 |
| 5,343,527 | 8/1994 | Moore | 380/4 |
| 5,347,579 | 9/1994 | Blandford | 380/25 |
| 5,421,006 | 5/1995 | Jablon | 395/575 |
| 5,469,507 | * 11/1995 | Canetti et al. | 380/30 |

(List continued on next page.)

OTHER PUBLICATIONS

Radai, Yisael, "Integrity Checking for Anti–Viral Purposes Theory and Practice," Dec. 26, 1994, see Sections 1, 2, 3, and 8.

\* cited by examiner

*Primary Examiner*—Norman M. Wright
(74) *Attorney, Agent, or Firm*—Blakely, Sokoloff, Taylor & Zafman LLP

(57) ABSTRACT

In one apparatus, a number of obfuscated programming instructions are equipped to self-verify whether execution of the obfuscated programming instructions is being observed. In another apparatus, a number of obfuscated programming instruction are equipped to determine whether the apparatus is being operated in a mode that supports single step execution of the obfuscated programming instructions. In yet another apparatus, a number of obfuscated programming instruction are equipped to verify whether an amount of elapsed execution time has exceeded a threshold. In yet another apparatus, a first and a second group of obfuscated programming instruction are provided to implement a first and a second tamper resistant technique respectively, with the first and the second group of programming instructions sharing a storage location for a first and a second key value corresponding to the first and the second tamper resistant technique.

32 Claims, 9 Drawing Sheets

U.S. PATENT DOCUMENTS

| | | | |
|---|---|---|---|
| 5,483,649 * | 1/1996 | Kuznetsov et al. | 395/186 |
| 5,535,276 * | 7/1996 | Ganesan | 380/25 |
| 5,559,960 | 9/1996 | Lettvin | 395/186 |
| 5,638,446 | 6/1997 | Rubin | 380/25 |
| 5,652,793 | 7/1997 | Priem | 380/4 |
| 5,668,874 * | 9/1997 | Kristol et al. | 380/23 |
| 5,684,875 | 11/1997 | Ellenberger | 380/4 |
| 5,768,382 | 6/1998 | Schneier | 380/23 |
| 5,822,431 * | 11/1998 | Sprunk | 380/25 |
| 5,966,306 * | 10/1999 | Nodine et al. | 364/468.28 |
| 6,006,328 * | 12/1999 | Drake | 713/200 |
| 6,049,609 | 4/2000 | Maliszewski | 380/28 |

TAMPER RESISTANT METHODS AND APPARATUS

RELATED APPLICATIONS

This application is a continuation-in-part application to U.S. patent application, Ser. No. 08/662,679, filed on Jun. 13, 1996, entitled Tamper Resistant Methods and Apparatus, now U.S. Pat. No. 5,892,899 which is hereby incorporated by reference, and to U.S. patent application, Ser. No. 08/906,693, filed on Aug. 6, 1997, entitled Cell Array Providing Non-Persistent Secret Storage Through A Mutation Cycle U.S. Pat. No. 6,049,609.

BACKGROUND OF THE INVENTION

1. Field of the Invention

The present invention relates to the field of system security. More specifically, the present invention relates to the tamper resistant methods and apparatus.

2. Background Information

Many applications, e.g. financial transactions, unattended authorizations and content management, require the basic integrity of their operations to be assumed, or at least verified. While a number of security approaches such as encryption and decryption techniques are known in the art, unfortunately, the security approaches can be readily compromised, because these applications and the security approaches are implemented on systems with an open and accessible architecture, that renders both hardware and software including the security approaches observable and modifiable by a malevolent user or a malicious program.

Thus, a system based on open and accessible architecture is a fundamentally insecure platform, notwithstanding the employment of security measures. However, openness and accessibility offer a number of advantages, contributing to these systems' successes. Therefore, what is required are techniques that will render software execution virtually unobservable or unmodifiable on these fundamentally insecure platforms, notwithstanding their openness and accessibility.

SUMMARY OF THE INVENTION

In one apparatus, a number of obfuscated programming instructions are equipped to self-verify whether execution of the obfuscated programming instructions is being observed.

In another apparatus, a number of obfuscated programming instruction are equipped to determine whether the apparatus is being operated in a mode that supports single step execution of the obfuscated programming instructions.

In yet another apparatus, a number of obfuscated programming instruction are equipped to verify whether an amount of elapsed execution time has exceeded a threshold.

In yet another apparatus, a first and a second group of obfuscated programming instruction are provided to implement a first and a second tamper resistant technique respectively, with the first and the second group of programming instructions sharing a storage location for a first and a second key value corresponding to the first and the second tamper resistant technique.

BRIEF DESCRIPTION OF DRAWINGS

The present invention will be described by way of embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
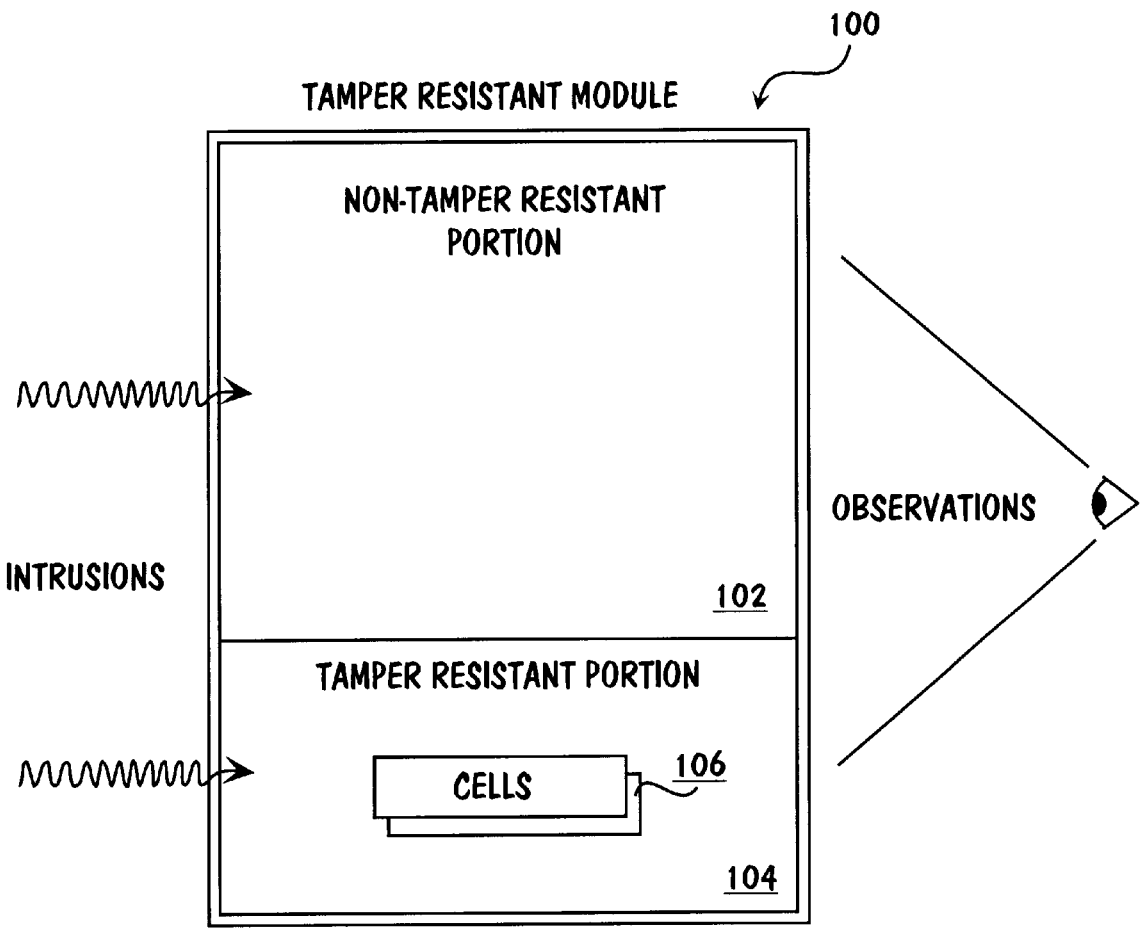
FIG. 1 is a block diagram illustrating an overview of an exemplary tamper resistant module incorporated with various teachings of the present invention.

Referring now to FIG. 1, wherein a block diagram illustrating one embodiment of an exemplary tamper resistant module incorporated with the various teachings of the present invention is shown. As illustrated, exemplary tamper resistant module 100 includes non-tamper resistant portion 102, and tamper resistant portion 104. For the illustrated embodiment, the two portions are linked together to form a single executable module. For the purpose of this application, the term module is used in a general sense to mean a structural relationship between the various portions that facilitates exclusive communications between the portions.

As described in the parent application, Ser. No. 08/662,679, non-tamper resistant portion 102 includes a number of plain text programming instructions implementing various non-sensitive services of exemplary tamper resistant module 100, whereas tamper resistant portion 104 includes various groups of plain text and obfuscated cells 106 of programming instructions implementing various sensitive services of exemplary tamper resistant module 100. Each group of cells that implements a sensitive service or a collection of sensitive services includes at least one plain text cell 106. Briefly, the secrets associated with the services are distributed in time and space, and obfuscated. The number of obfuscated cells employed to obfuscate a service is service or sensitivity dependent. Generally, the larger number of obfuscated cells employed, the more difficult it will be for the obfuscation to be "decoded". For a more detailed description, see parent application, Ser. No. 08/662,679.

Additionally, in accordance with the present invention, selected groups of plain text and obfuscated cells 106 incorporate a number of tamper resistant measures to verify during operation that exemplary tamper resistant module 100 has not been intruded nor being observed. The number of groups employing these tamper resistant measures, as well as the frequencies and the number of tamper resistant measures employed are also service or sensitivity dependent. As will be described in more details below, these tamper resistant measures include a number of integrity verification measures and a number of anti-observation measures. The integrity verification measures include first integrity verification measure that verifies the integrity of non-tamper resistant portion 102 during run time as well as start-up time, and a second integrity verification measure that verifies an invocation of a group of plain text and obfuscated cells is not originated from an intruder. The anti-observation measures include a first anti-observation measure that verifies the processor executing module 100 is not operating in a mode that supports single step execution, and a second anti-observation measure that verifies elapsed execution times are consistent with normal unobserved execution.

Figure 2:
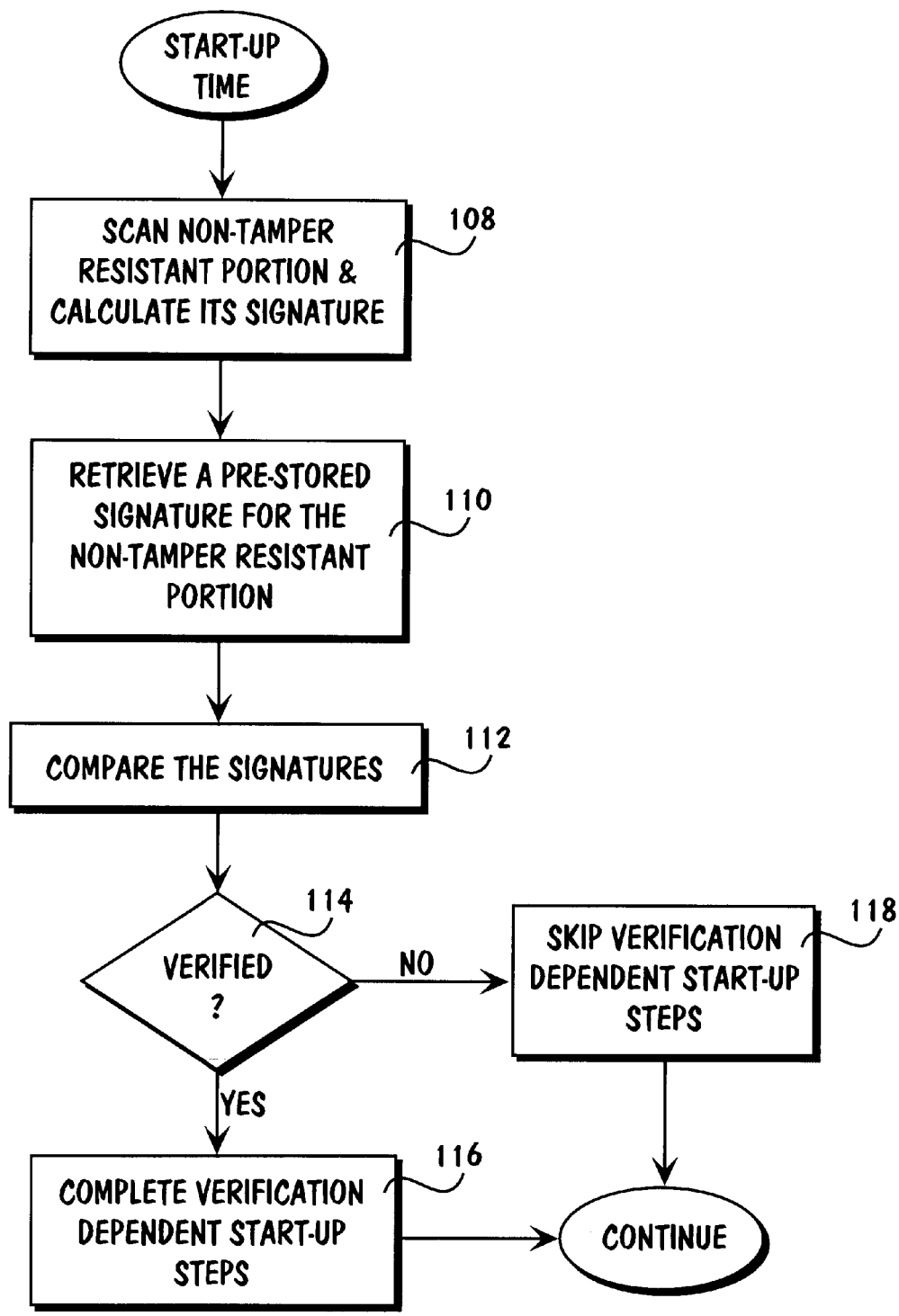
FIGS. 2–3 are two flow charts illustrating one embodiment each of the operational flows, at start-up time and during runtime, of an integrity verification method of the present invention
Figure 3:
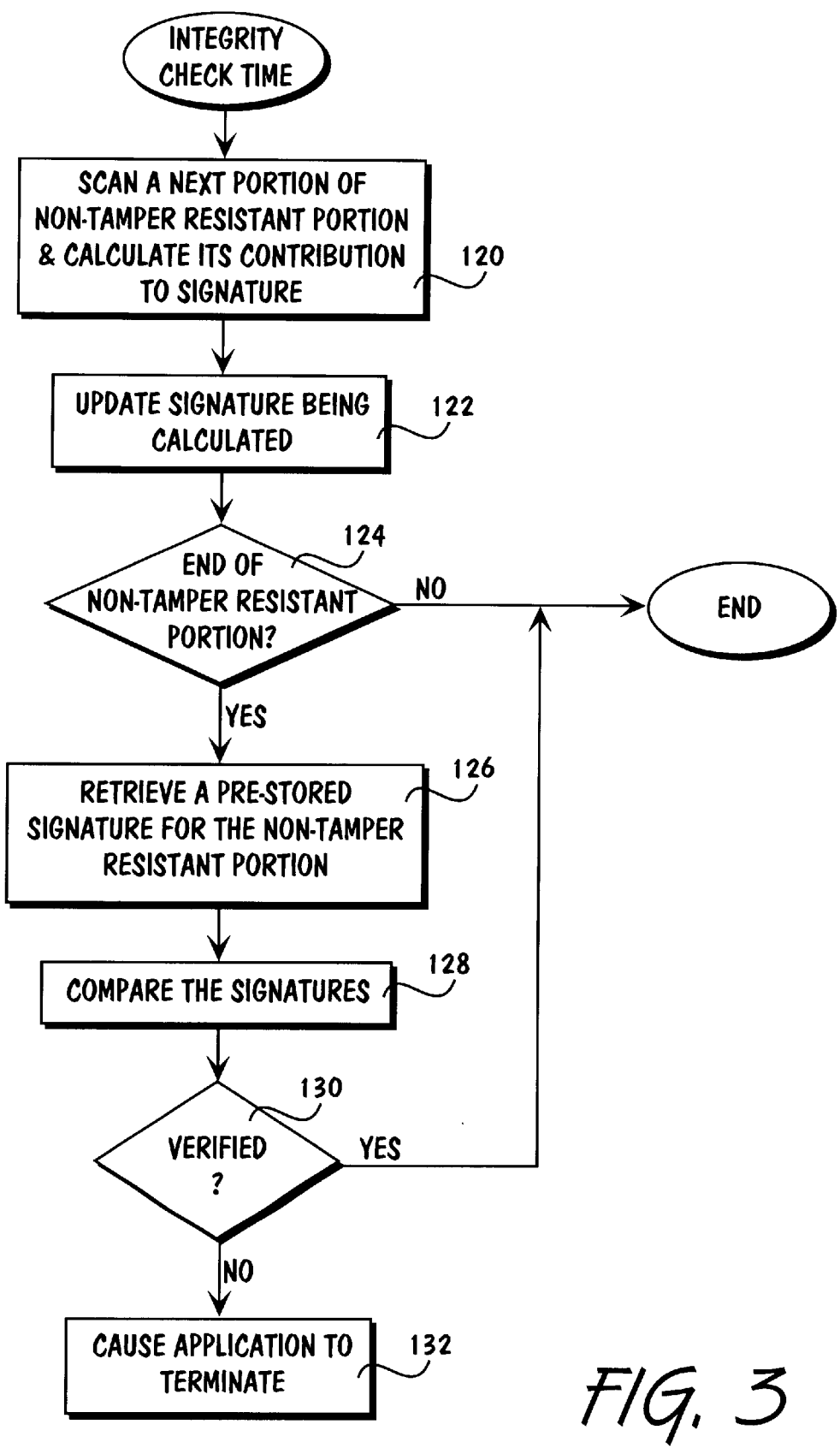

FIGS. 2–3 illustrate one embodiment of the operational flow of the first integrity verification measure. FIG. 2 illustrates the operational flow at start-up time, whereas FIG. 3 illustrates the operational flow during run time. As shown in FIG. 2, at start-up time, for the illustrated embodiment, a group of cells (GOC) incorporated with this first integrity verification measure scans non-tamper resistant portion 102 and calculates a signature for non-tamper resistant portion 102, block 108. Next, for the illustrated embodiment, the GOC retrieves a signature pre-stored for non-tamper resistant portion 102, block 110. The GOC then compares the two signatures to verify the generated signature, blocks 112–114. If the generated signature is successfully verified, meaning that non-tamper resistant portion 102 has not been modified, the GOC allows the start-up process to continue, without skipping any verification dependent operations, block 116, otherwise, the GOC causes the start-up process to continue, skipping the verification dependent operations, block 118. An example of verification dependent operations is operations associated with setting up the secrets required for delivering certain sensitive services.

As shown in FIG. 3, at a verification check time during run time, for the illustrated embodiment, a GOC incorporated with this first integrity verification measure scans a next portion of non-tamper resistant portion 102 and incrementally calculates a signature for non-tamper resistant portion 102, block 120. The GOC then updates the signature being incrementally calculated, block 122. Next, the GOC checks if the end of non-tamper resistant portion 102 has been reached, block 124. If the end has not been reached, the process terminates, otherwise the process continues at block 126.

At block 126, the GOC retrieves a signature pre-stored for non-tamper resistant portion 102, block 126. The GOC then compares the two signatures to verify the generated signature, blocks 128–130. If the generated signature is successfully verified, meaning that non-tamper resistant portion 102 has not been modified, the GOC allows execution of module 100 to continue, otherwise, the GOC causes execution of module 100 to terminate, block 132. Causing module to terminate may be achieved in any number of ways known in the art. Depending on the application, it may be preferable to cause the module to fail further downstream from the point the non-tamper resistant portion's integrity failed verification. In other words, the run time integrity check is performed incrementally over a number of verification check times during an execution run. Those skilled in the art will appreciate the incremental approach is particularly useful for performance sensitive services. The number of verification check times employed for an execution run is service or sensitivity dependent.

Figure 4:
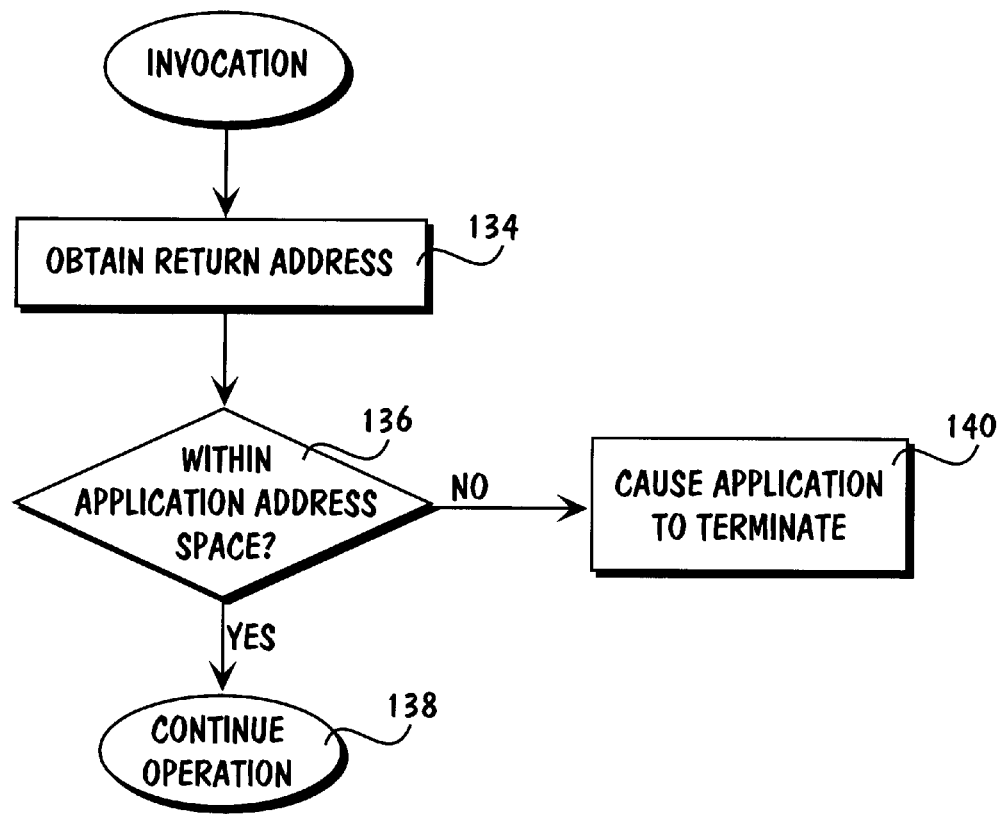
FIG. 4 is a flow chart illustrating one embodiment of the operational flow of an intruder detection method of the present invention.

FIG. 4 illustrates one embodiment of the operational flow of the second integrity verification measure. At invocation time, for the illustrated embodiment, a GOC incorporated with this second integrity verification measure retrieves a return address for the invocation, block 134. For the illustrated embodiment, the GOC determines if the return address is within the address space of module 100, block 136. If the return address is within the address space of module 100, meaning that the invocation did not originate from an intruder, the GOC allows execution of module 100 to continue, block 138, otherwise, the GOC causes execution of module 100 to terminate, block 140. Similarly, causing module 100 to terminate may be achieved in any number of ways known in the art. Depending on the application, it may be preferable to cause the module to fail further downstream from the point the intrusion is detected.

Figure 5:
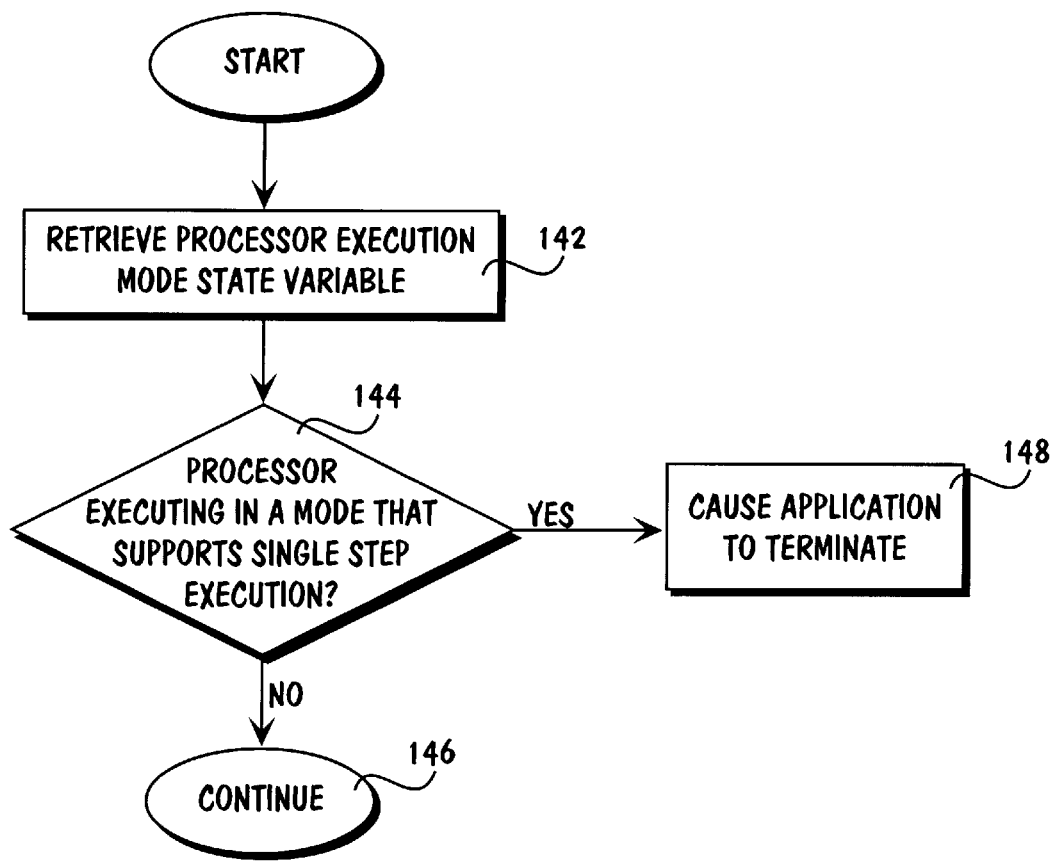
FIGS. 5–6 are two flow charts illustrating one embodiment each of the operational flows of two observation detection methods of the present invention.

FIG. 5 illustrates one embodiment of the operational flow of the first anti-observation measure. At a pre-selected point in time during an execution run, for the illustrated embodiment, a GOC incorporated with this first anti-observation measure retrieves a processor execution mode state variable, block 142. For the illustrated embodiment, the GOC determines if the state variable denotes an execution mode that supports single step execution, e.g. a debug mode, block 144. If the state variable denotes an execution mode that does not support single step execution, meaning that execution of module 100 is not being observed, the GOC allows execution of module 100 to continue, block 146, otherwise, the GOC causes execution of module 100 to terminate, block 148. Similarly, causing module to terminate may be achieved in any number of ways known in the art. Depending on the application, it may be preferable to cause the module to fail further downstream from the point observation is detected. The number of times as well as the precise points in time during an execution run where the processor's execution mode is checked is service or sensitivity dependent.

Figure 6:
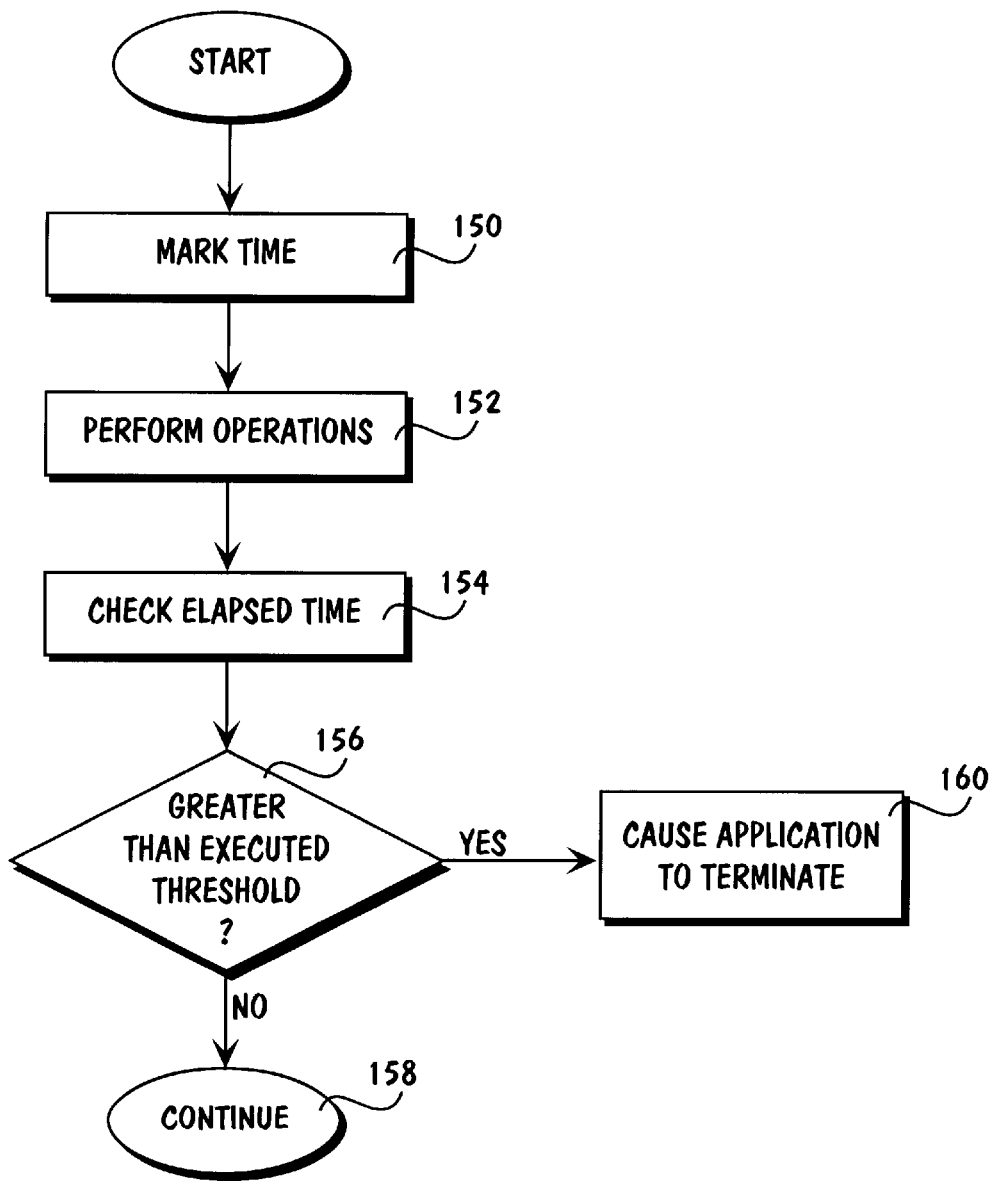

FIG. 6 illustrates one embodiment of the operational flow of the second anti-observation measure. At a pre-selected point in time during an execution run, for the illustrated embodiment, a GOC incorporated with this second anti-observation measure retrieves a timer value from the processor executing module 100, and records the retrieved timer value (timestamp), block 150. The GOC then continues to perform the normal services it is designed to provide, block 152. At a pre-selected later point in time, the GOC checks an amount of elapsed execution time since the last timestamp to determine if the amount of elapsed execution has exceeded a predetermined threshold, blocks 154–156. If the elapsed execution time does not exceed the predetermined threshold, meaning that execution of module 100 is not being observed (e.g. by setting breakpoints), the GOC allows execution of module 100 to continue, block 158, otherwise, the GOC causes execution of module 100 to terminate, block 160. Similarly, causing module to terminate may be achieved in any number of ways known in the art. Depending on the application, it may be preferable to cause the module to fail further downstream from the point observation is detected. The number of times as well as the precise points in time during an execution run where the amount of elapsed execution time since a last timestamp is checked is service or sensitivity dependent.

Figure 7:
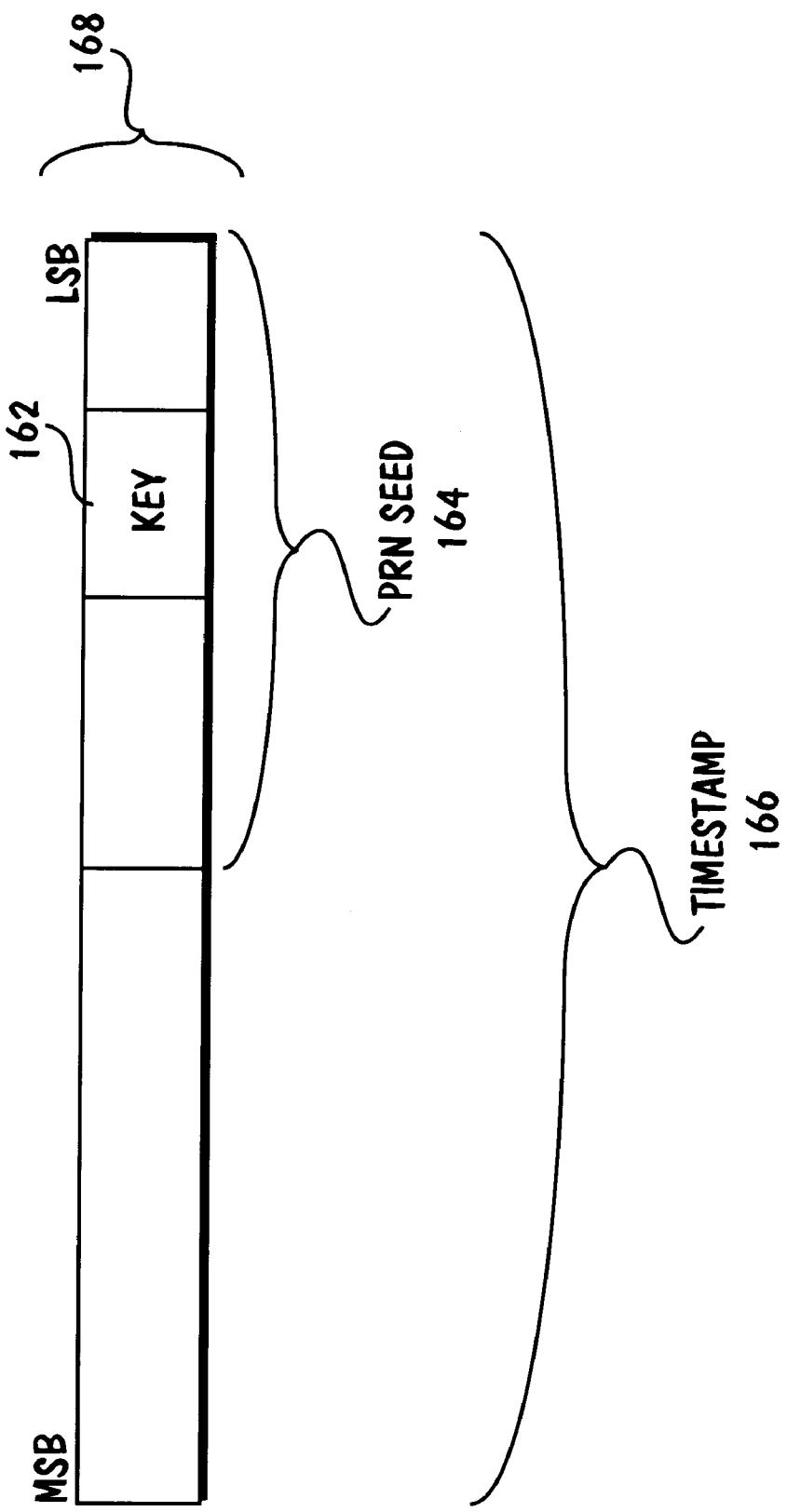
FIG. 7 is a block diagram illustrating one embodiment of a coupling technique of the present invention for inter-coupling various tamper resistant methods.

FIG. 7 illustrates one embodiment of a coupling technique for intercoupling tamper resistant measures. As illustrated, the different tamper resistant measures are inter-coupled by having the measures share a common storage location, e.g. in memory, for key values associated with the various tamper resistant measures. For the illustrated embodiment, a GOC stores a key for retrieving secrets in portion 162 of storage location 168, and a timestamp for determining whether execution of module 100 is being observed in storage location 168 less portion 162. In determining elapsed execution time, the GOC only employs the bits higher than portion 162. Additionally, the GOC uses lower order bits 164 as a seed to generate the pseudo random numbers employed in an authentication process. Thus, if an intruder attempts to modify the timestamp to defeat the elapsed execution time check measure, it will cause the authentication process as well as any attempt to retrieve secrets to fail. Similarly, if an intruder attempts to modify the seed for generating pseudo random number to defeat the authentication process, it will cause the elapsed execution time check as well as any attempt to retrieve secrets to fail.

Figure 8:
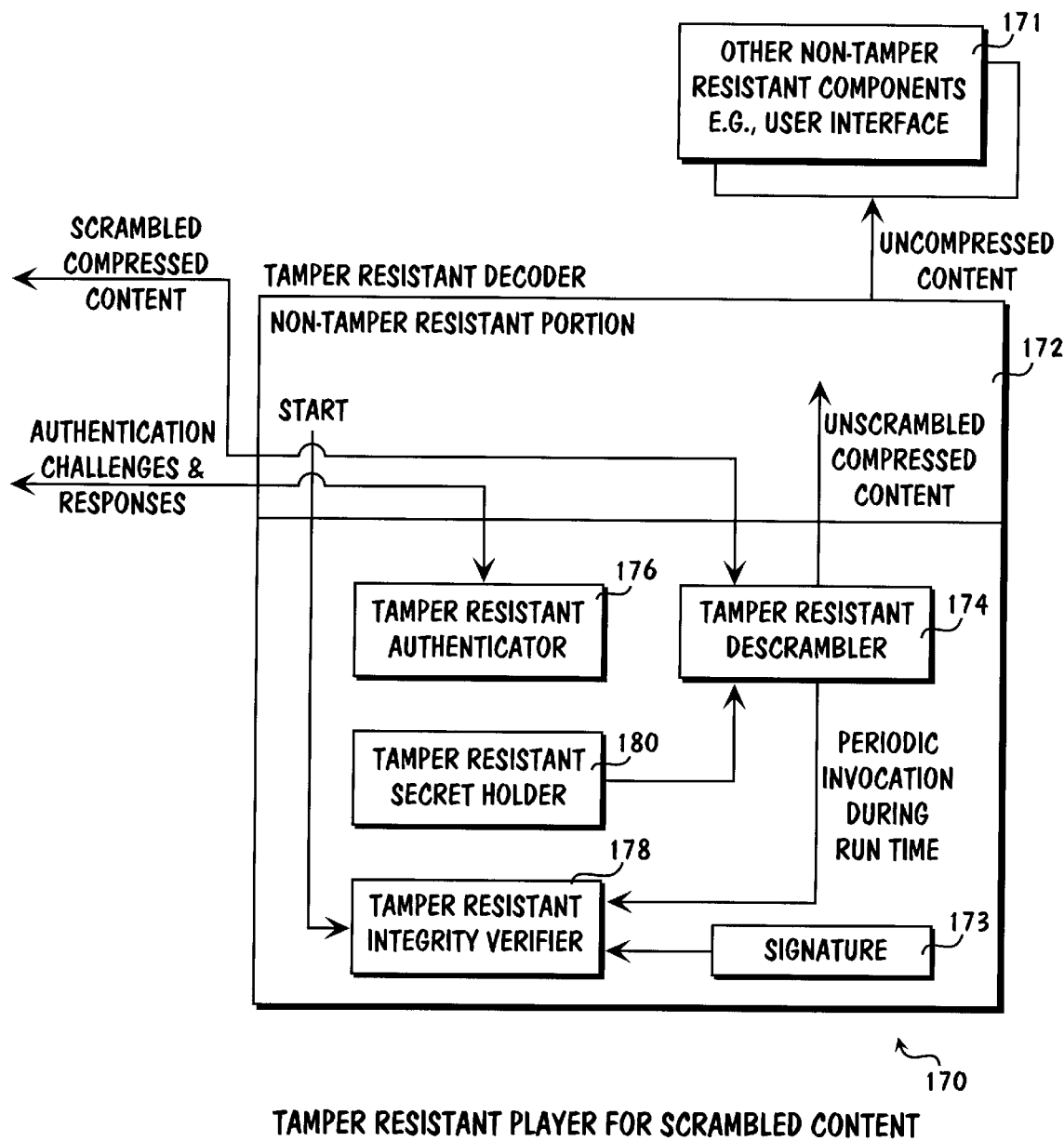
FIG. 8 is a block diagram illustrating one embodiment of a tamper resistant player for scrambled contents, incorporated with the teachings of the present invention.

FIG. 8 illustrates one embodiment of a tamper resistant player for scrambled content applying the tamper resistant teachings of the present invention. As shown, for the illustrated embodiment, tamper resistant player 170 includes non-tamper resistant components 171 and tamper resistant decoder 172. Non-tamper resistant components 171 are intended to represent a broad category of general service components, such as end user interfaces. These general service components may provide any one of a number of variety of services, implemented using any one of a number of variety of techniques known in the art. Tamper resistant decoder 172 receives scrambled compressed content, and in response, descrambles as well as decompresses the content to output appropriate signals to render the content, e.g. YUV video and AC3 audio.

Tamper resistant decoder 172 includes non-tamper resistant portion 175, tamper resistant portion 174, 176, 178 and 180, and signature 173 for non-tamper resistant portion 175. Non-tamper resistant portion 175 is constituted with plain text programming instructions, whereas tamper resistant portion 174, 176, 178 and 180 is constituted with multiple groups of plain text and obfuscated cells of programming instructions. Non-tamper resistant portion 175 and tamper resistant portion 174, 176, 178 and 180, including signature 173, are structurally related to facilitate exclusive communication between the portions. For the illustrated embodiment, the two portions are linked together as a single executable module.

Non-tamper resistant portion 175 selectively invokes the services of integrated tamper resistant portion 174, 176, 178 and 180 to effectuate descrambling of the scrambled content, including causing player 170 and a scrambled content provider device to be mutually authenticated with one another. Non-tamper resistant portion 175 decompresses the unscrambled compressed content to generate the above described output signals. Signature 173 is pre-stored in a predetermined location to facilitate start-up time and run time integrity verification as described earlier.

For the illustrated embodiment, tamper resistant services of tamper resistant decoder 172 includes tamper resistant descrambler 174 for receiving scrambled content, and in response, descrambling the scrambled content to generate the descrambled content for non-tamper resistant portion of decoder 172. In one embodiment, tamper resistant descrambler 174 employs secret keys retrieved from tamper resistant secrets holder 180 to descramble the scrambled content. The number of secret keys employed, and the nature of the keys are application dependent, and they are not essential to the understanding of the present invention. Tamper resistant descrambler 174 is constituted with a group of plain text and obfuscated cells of programming instructions. In one embodiment, the core descrambling service is disposed in a plain text cell to provide enhanced performance. In one embodiment, the GOC is equipped with the above described intruder detection integrity verification measure and the single step execution mode detection anti-observation measure. In one embodiment, the GOC is also equipped with the elapsed execution time detection anti-observation measure. In one embodiment, the GOC is equipped with multiple ones of the elapsed execution time detection anti-observation measure. In one embodiment, the elapsed execution time detection anti-observation measure is also inter-coupled with the process for retrieving the secret keys associated with descrambling scrambled content, and the authentication process for mutually authenticating player 170 and a scrambled content provider device.

For the illustrated embodiment, tamper resistant services of tamper resistant decoder 172 also includes tamper resistant authenticator 176 for authenticating tamper resistant player 170 to a scrambled content provider device and to authenticate the scrambled content provider device to tamper resistant player 170. In one embodiment, tamper resistant authenticator 176 employs secret keys retrieved from tamper resistant secrets holder 180 to conduct the authentication process. The number of secret keys employed, and the nature of the keys are application dependent, and they are not essential to the understanding of the present invention. In one embodiment, tamper resistant authenticator 176 is constituted with a group of plain text and obfuscated cells of programming instructions. In one embodiment, the GOC is equipped with the above described intruder detection integrity verification measure, and the single step execution mode detection anti-observation measure. In one embodiment, the GOC is also equipped with the elapsed execution time detection anti-observation measure. In one embodiment, the GOC is equipped with multiple ones of the elapsed execution time detection anti-observation measures. In one embodiment, the elapsed execution time detection anti-observation measure is also inter-coupled with the process for retrieving the secret keys associated with descrambling scrambled content, and the authentication process for mutually authenticating player 170 and a scrambled content provider device.

For the illustrated embodiment, tamper resistant services of tamper resistant decoder 172 also includes tamper resistant integrity verifier 178 for integrity verifying non-tamper resistant portion of decoder 172 at start-up time, and during run time. In one embodiment, tamper resistant integrity verifier 178 provides secret keys to be employed for mutually authenticating player 170 and a scrambled content provider device to secrets holder 180. The number of secret keys employed, and the nature of the keys are application dependent, and they are not essential to the understanding of the present invention. In one embodiment, tamper resistant integrity verifier 178 is constituted with a group of plain text and obfuscated cells of programming instructions. In one embodiment, the GOC is equipped with the single step execution mode detection anti-observation measure. In one embodiment, the GOC is also equipped with the elapsed execution time detection anti-observation measure. In one embodiment, the GOC is equipped with multiple ones of the elapsed execution time detection anti-observation measures. In one embodiment, the elapsed execution time detection anti-observation measure is also inter-coupled with the authentication process for retrieving the secret keys associated with descrambling scrambled content, and the authentication process for mutually authenticating player 170 and a scrambled content provider device.

Lastly, as alluded to, for the illustrated embodiment, tamper resistant services of tamper resistant decoder 172 includes tamper resistant secrets holder 180 for storing secrets associated with descrambling scrambled content. Secrets holder 180 also stores secrets associated with an authentication process for authenticating tamper resistant player 170 to a scrambled content provider device and to authenticate the scrambled content provider device to tamper resistant player 170. In one embodiment, tamper resistant secrets holder 180 is constituted with a group of plain text and obfuscated cells of programming instructions in a cell array form as described in parent application, Ser. No. 08/906,693 now U.S. Pat. No. 5,892,899. In one embodiment, the GOC is equipped with the above described intruder detection integrity verification measure, and the single step execution mode detection anti-observation measure. In one embodiment, the GOC is also equipped with the elapsed execution time detection anti-observation measure. In one embodiment, the GOC is equipped with multiple ones of the elapsed execution time detection anti-observation measures.

Thus, even if player 170 receives its content inputs through an "open" bus, the content is nevertheless protected, as the content will be provided to player 170 over the "open" bus in scrambled form. Furthermore, the secrets associated with descrambling the scrambled content, as well as the programming instructions performing the descrambling are protected from intrusion as well as from observation. Yet, performance sensitive operations, such as the core descrambling service, are not burdened. Lastly, the tamper resistant services, i.e. descrambler 174, authenticator 176 etc. are highly portable, and may be linked up with any number of decoder implementations.

Figure 9:
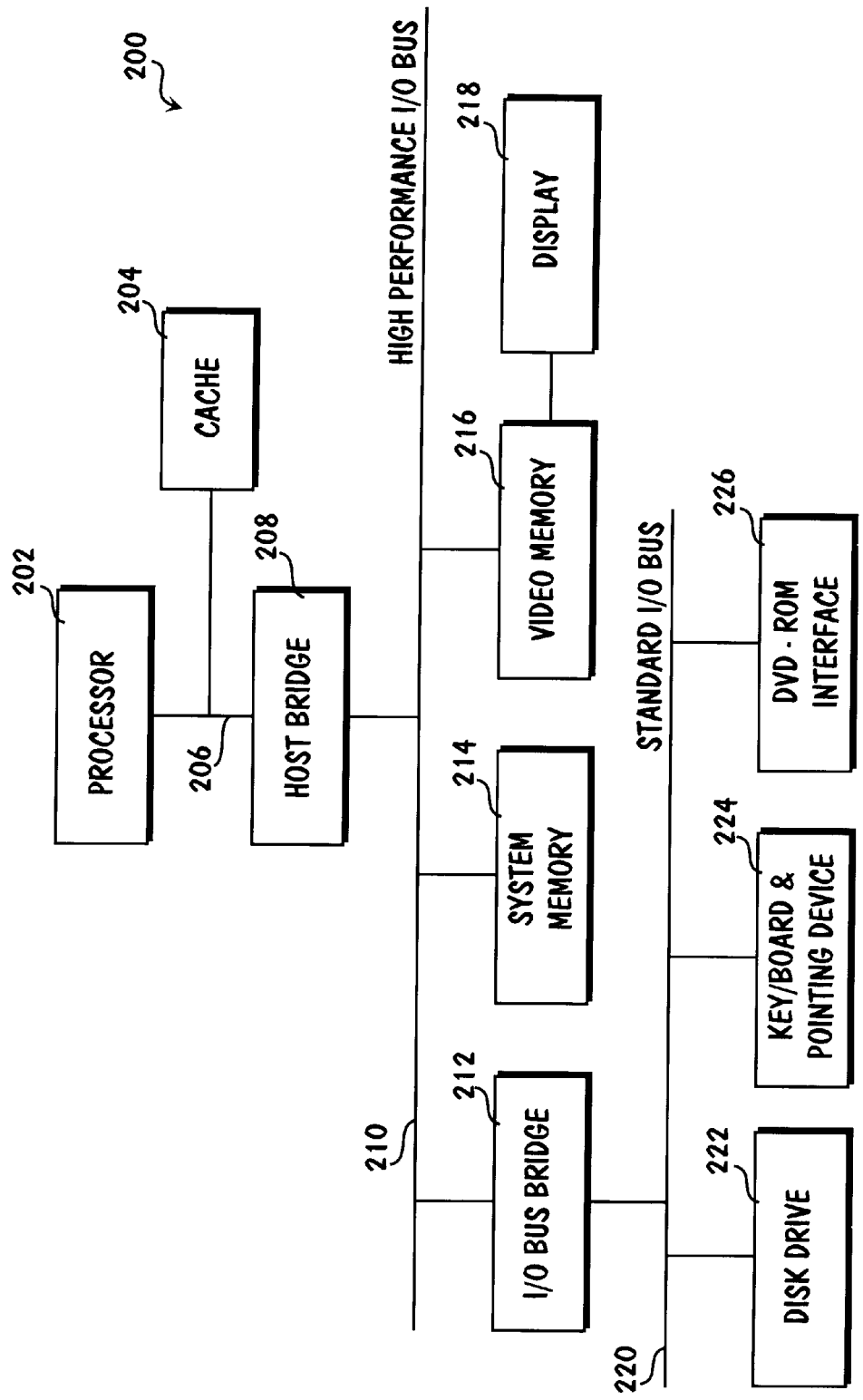
FIG. 9 is a block diagram illustrating one embodiment of a computer system suitable for practicing the present invention.

FIG. 9 illustrates one embodiment of a computer system suitable for practicing the present invention. As shown, for the illustrated embodiment, computer system 200 includes processor 202, processor bus 206, high performance I/O bus 210 and standard I/O bus 220. Processor bus 206 and high performance I/O bus 210 are bridged by host bridge 208, whereas I/O buses 210 and 212 are bridged by I/O bus bridge 212. Coupled to processor bus 206 is cache 204. Coupled to high performance I/O bus 210 are system memory 214 and video memory 216, to which video display 218 is coupled. Coupled to standard I/O bus 220 are disk drive 222, keyboard and pointing device 224 and DVD-ROM 226.

These elements perform their conventional functions known in the art. In particular, disk drive 222 and system memory 214 are used to store a permanent and a working copy of the tamper resistant application of the present invention, when executed by processor 202. The permanent copy may be pre-loaded into disk drive 222 in factory, loaded from a distribution medium (not shown), or down loaded from on-line/networked distribution source (not shown). The constitutions of these elements are known. Any one of a number of implementations of these elements known in the art may be used to form computer system 200.

Of course, computer systems of alternate constitutions, including computer systems of alternate architectures may also be employed to practice the present invention.

In general, while the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, various tamper resistant methods and apparatus have been described.

What is claimed is:

1. An apparatus comprising:
    a storage medium having stored therein a plurality of obfuscated cells of programming instructions designed to self-verify whether execution of the plurality of obfuscated programming instructions is being observed, wherein the obfuscated cells are mutated through an inter-cell dependent mutation process; and
    an execution unit coupled to the storage medium for executing the programming instructions.

2. The apparatus as set forth in claim 1, wherein the plurality of obfuscated cells of programming instructions include obfuscated cells of programming instructions designed to determine whether the apparatus is being operated in a mode that supports single step execution of the obfuscated cells of programming instructions.

3. The apparatus as set forth in claim 2, wherein the plurality of obfuscated cells of programming instructions include obfuscated cells of programming instructions designed to access a state variable of the apparatus to perform said single step execution support determination.

4. The apparatus as set forth in claim 1, wherein the plurality of obfuscated cells of programming instructions include obfuscated cells of programming instructions designed to verify whether an amount of elapsed execution time has exceeded a threshold.

5. The apparatus as set forth in claim 4, wherein the plurality of obfuscated cells of programming instructions further include obfuscated cells of programming instructions designed to calculate the amount of elapsed execution time based on a recorded timestamp.

6. The apparatus as set forth in claim 5, wherein the plurality of obfuscated cells of programming instructions further include obfuscated cells of programming instructions designed to retrieve a current value of a timer of the apparatus, and store the retrieved current value of the timer as the recorded timestamp.

7. The apparatus as set forth in claim 6, wherein the obfuscated cells of programming instructions designed to store the retrieved current value of the timer as the recorded timestamp/store the retrieved current value in a storage location shared with at least one other tamper resistant technique.

8. A method comprising:
   a) executing a plurality of obfuscated cells of programming instructions, wherein the obfuscated cells are mutated through an inter-cell dependent mutation process;
   b) self-verifying by the plurality of obfuscated cells of programming instructions that the execution is not being observed; and
   c) terminating said execution of (a) if (b) verified that the execution is being observed.

9. The method of claim 8, wherein (b) comprises the plurality of obfuscated cells of programming instructions determining whether the obfuscated cells of programming instructions are being executed in a mode that supports single step execution.

10. The method of claim 9, wherein (b) comprises the plurality of obfuscated cells of programming instructions accessing a state variable to make said single step execution support determination.

11. The method of claim 8, wherein (b) comprises the plurality of obfuscated cells of programming instructions verifying whether an amount of elapsed execution time has exceeded a threshold.

12. The method of claim 11, wherein (b) further comprises calculating the amount of elapsed execution time based on a recorded timestamp.

13. The method of claim 12, wherein (b) further comprises retrieving a current value of a timer, and storing the retrieved current value of the timer as the recorded timestamp.

14. The method of claim 13, wherein (b) comprises storing the retrieved current value in a storage location shared with another tamper resistant technique.

15. An apparatus comprising:
   a storage medium having stored therein a plurality of obfuscated cells of programming instructions designed to determine whether the apparatus is being operated in a mode that supports single step execution of the obfuscated cells of programming instructions, wherein the obfuscated cells are mutated through an intercell dependent mutation process; and
   an execution unit coupled to the storage medium for executing the programming instructions.

16. The apparatus as set forth in claim 15, wherein the plurality of obfuscated cells of programming instructions include obfuscated cells of programming instructions designed to access a state variable of the apparatus to perform said single step execution support determination.

17. A method comprising:
   a) executing a plurality of obfuscated cells of programming instructions, wherein the obfuscated cells are mutated through an inter-cell dependent mutation process;
   b) determining whether the obfuscated cells of programming instructions are being executed in a mode that supports single step execution; and
   c) terminating said execution of (a) if (b) verified that the execution is being executed in a mode that supports single step execution.

18. The method of claim 17, wherein (b) comprises the plurality of obfuscated cells of programming instructions accessing a state variable to make said single step execution support determination.

19. An apparatus comprising:
   a storage medium having stored therein a plurality of obfuscated cells of programming instructions designed to verify whether an amount of elapsed execution time has exceeded a threshold, wherein the obfuscated cells are mutated through an inter-cell dependent mutation process; and
   an execution unit coupled to the storage medium for executing the programming instructions.

20. The apparatus as set forth in claim 19, wherein the plurality of obfuscated cells of programming instructions further include obfuscated cells of programming instructions designed to calculate the amount of elapsed execution time based on a recorded timestamp.

21. The apparatus as set forth in claim 20, wherein the plurality of obfuscated cells of programming instructions further include obfuscated cells of programming instructions designed to retrieve a current value of a timer of the apparatus, and store the retrieved current value of the timer as the recorded timestamp.

22. The apparatus as set forth in claim 21, wherein the obfuscated cells of programming instructions designed to store the retrieved current value of the timer as the recorded timestamp, store the retrieved current value in a storage location shared with at least one other tamper resistant technique.

23. A method comprising:
   a) executing a plurality of obfuscated cells of programming instructions, wherein the obfuscated cells are mutated through an inter-cell dependent mutation process;
   b) verifying whether an amount of elapsed execution time has exceeded a threshold; and
   c) terminating said execution of (a) if (b) verified that the execution is being observed.

24. The method of claim 23, wherein (b) further comprises calculating the amount of elapsed execution time based on a recorded timestamp.

25. The method of claim 24, wherein (b) further comprises retrieving a current value of a timer, and storing the retrieved current value of the timer as the recorded timestamp.

26. The method of claim 25, wherein (b) comprises storing the retrieved current value in a storage location shared with another tamper resistant technique.

27. An apparatus comprising:
   a storage medium having stored therein a first and a second plurality of obfuscated cells of programming instructions designed to implement a first anti-observation tamper resistant technique and an observation detection tamper resistant technique respectively, with the first and the second plurality of obfuscated cells of programming instructions sharing a storage location for a first and a second key value corresponding to the first anti-observation and the observation detection tamper resistant techniques, wherein the obfuscated cells are mutated through an inter-cell dependent mutation process; and
   an execution unit coupled to storage medium for executing the programming instructions.

28. The apparatus as set forth in claim 27, wherein the first plurality of obfuscated cells of programming instructions are designed to implement a key based secret retrieval technique, and the second plurality of obfuscated cells of programming instructions are designed to verify that an amount of elapsed execution time has not exceeded a threshold.

29. The apparatus as set forth in claim 27, wherein the storage medium further having stored therein a third plurality of obfuscated cells of programming instructions designed to implement a second anti-observation tamper resistant technique, with the third plurality of obfuscated cells of programming instructions also sharing the same storage location for a third key value corresponding to the second anti-observation tamper resistant technique.

30. The apparatus as set forth in claim 29, wherein the first plurality of obfuscated cells of programming instructions are designed to implement a key based secret retrieval technique, the second plurality of obfuscated cells of programming instructions are designed to verify that an amount of elapsed execution time has not exceeded a threshold, and the third plurality of obfuscated cells of programming instructions are designed to implement an authentication process.

31. A method comprising:
   a) executing a first plurality of obfuscated cells of programming instructions to implement a first anti-observation tamper resistant technique, including storing a first key value corresponding to the first anti-observation tamper resistant technique in a shared storage location, wherein the obfuscated cells are mutated through an intercell dependent mutation process; and
   b) executing a second plurality of obfuscated cells of programming instructions to implement an observation detection tamper resistant technique, including storing a second key value corresponding to the observation detection tamper resistant technique in the same shared storage location.

32. The method of claim 31, wherein the method further comprises (c) executing a third plurality of obfuscated cells of programming instructions to implement a second anti-observation tamper resistant technique, including storing a third key value corresponding to the second anti-observation tamper resistant technique in the same shared storage location.

* * * * *